United States Patent [19]

Cheong

[11] Patent Number: 5,556,662
[45] Date of Patent: Sep. 17, 1996

[54] LOW FAT SAUSAGE MANUFACTURE

[75] Inventor: Sung Hee Cheong, Helsingborg, Sweden

[73] Assignee: Nestec S.A., Vevey, Switzerland

[21] Appl. No.: 264,779

[22] Filed: Jun. 23, 1994

[30] Foreign Application Priority Data

Jul. 5, 1993 [EP] European Pat. Off. .............. 93810472

[51] Int. Cl.$^6$ ..................................... A23L 1/317
[52] U.S. Cl. ........................................... 426/646; 426/412
[58] Field of Search ................................. 426/264, 646, 426/407, 412

[56] References Cited

U.S. PATENT DOCUMENTS

| | | | |
|---|---|---|---|
| 2,847,312 | 8/1958 | Haffer et al. | 426/264 |
| 3,561,978 | 2/1971 | Geisler et al. | 426/646 X |
| 3,565,637 | 2/1971 | Artar | 426/646 |
| 4,123,557 | 10/1978 | Epstein et al. | 426/646 X |

FOREIGN PATENT DOCUMENTS

| | | |
|---|---|---|
| 0279883A1 | 8/1988 | European Pat. Off. . |
| 3344521A1 | 6/1985 | Germany . |
| 3608859A1 | 9/1987 | Germany . |
| 0621335 | 8/1978 | U.S.S.R. . |

OTHER PUBLICATIONS

Giese, "Developing Low—Fat Meat Products," Food Technology, 46 (1992), No. 4, Apr. pp. 100–108.
Bechtel, et al., "Properties of Frankfurters Processed With Different Levels of Sodium Bicarbonate," Journal of Food Protection, vol. 48, No. 10, pp. 861–864, (Sep. 1985).

*Primary Examiner*—Arthur L. Corbin
*Attorney, Agent, or Firm*—Vogt & O'Donnell, LLP

[57] ABSTRACT

A low-fat sausage composition is prepared without addition of a substance for binding the composition by chopping lean ground meat in a sequence of three chopping steps wherein the first two chopping steps are carried out with addition of a cryogenic refrigerant of liquid nitrogen or carbon dioxide for maintaining a temperature during chopping in the first step between −2° C. and 10° C. for from 2 minutes to 10 minutes and during chopping in the second step between 1° C. and 10° C. for up to 10 minutes. During the first chopping step of the sequence, ice and a nitrite curing salt are added to the meat, and during the second chopping step of the sequence, fat is added in an amount so that the composition obtained has a fat content of from 1% to 20% by weight. During the third chopping step of the sequence, the composition is chopped until it reaches a temperature between 12° C. and 15° C., and then this composition is stuffed, reddened and heated.

18 Claims, No Drawings

LOW FAT SAUSAGE MANUFACTURE

BACKGROUND OF THE INVENTION

The present invention concerns a process for manufacturing low fat sausages which comprises preparing a meat batter comprising meat, added fat, ice and nitrite curing salt in such proportions that it has a fat content of from 1 to 20%.

German Patent Application No. DE 3344521 discloses a process and an apparatus comprising a cutter for the manufacture of meat batter in which liquid nitrogen is intermittently sprayed onto the rotating blades of the cutter to counteract the heat produced by operating friction. This process appears to have a positive influence on the organoleptical properties, the aspect and the keeping properties of the otherwise traditional sausages made of this batter. This patent does not suggest that this process and apparatus could be useful for the manufacture of low fat sausages.

Traditional finely comminuted cooked meat sausage products comprise about 40 to 50% lean meat, 25 to 35% added fat and 20 to 30% water. A simple approach for the fat reduction is the change of formulation of sausage products. Instead of added fat, one can use more meat and ice. However, such a reduction of the amount of added fat may lessen the water binding in the sausage product by way of a strong shrinkage of protein matrices during heat treatment due to a poor distribution of fat particles in these matrices, an increased water content due to the substitution of meat and water for fat, and a lower ionic strength in the aqueous phase.

A known way for recovering a good water binding in such sausage products is to use fat substitutes or binders such as protein or carbohydrate based substitutes or synthetic compounds. However, fat substitutes are not always as much appreciated as natural fats and binders can affect the organoleptical properties of the sausage products.

SUMMARY OF THE INVENTION

The object of the present invention is to provide a process for the manufacture of low fat sausages, having good organoleptical properties, which may be compared with those of traditional full fat sausages, by purely technological means without the need to add fat substitutes or binders.

To this end, the process for manufacturing low fat sausages in accordance with the present invention, in which a meat batter is prepared with meat, added fat, ice and nitrite curing salt in such proportions that it has a fat content of from 1 to 20%, comprises:

grinding comminuted meat, chopping the ground meat, while adding the ice, nitrite curing salt and optionally phosphate, at a temperature maintained between −2° C. and 10° C., preferably between −2° C. and 3° C., by the addition of a cryogenic refrigerant, preferably liquid nitrogen or carbon dioxide for 2 to 10 min, chopping, while adding the fat, at a temperature maintained between 1° C. and 10° C., preferably between 1° C. and 7° C., by the addition of liquid nitrogen for up to 10 min, chopping to a temperature between 12° C. and 15° C., stuffing, reddening and heating.

DETAILED DESCRIPTION OF THE INVENTION

Sausage manufactured by the present process has surprisingly good properties with regard to water binding, texture and colour. The present process especially minimises cooking losses and jelly separation, improves texture and mouthfeel of low fat sausages, and even permits reduction of the salt and phosphate content as compared with traditional recipes.

Texture analyses using the Instron Universal Testing Machine showed that products made by the present process had significantly lower hardness values than control samples. They also were slightly lighter when measured with a Minolta chromameter. This can be judged as positive since, generally, low fat products tend to be darker and firmer than traditional full-fat products.

Triangle tests did not show any difference in taste between products made by the present process and controls. It was observed that the surface of sliced control samples was wet and rough, whereas that of the products made by the present process was glossy and smooth.

The success of the present process for manufacturing low fat sausages is likely to be due to the fact that it permits a prolonged chopping as compared with traditional chopping times. The present long and intensive chopping under carefully controlled temperature appears to permit the fat particles to be very uniformly distributed within the meat batter thus preventing a strong shrinking of the meat protein matrices in low fat products during heating. Scanning electron microscopy showed that the fat particles were smaller (10–20μm) and more homogeneous in size in the present product than in control samples. This prolonged chopping also appears to improve protein swelling and gelling properties without inducing any protein denaturation. The extracted soluble protein was about 44% in meat batters prepared by the present process while it was about 40% in controls.

The present process can be carried out for manufacturing low fat sausage products of the type of finely comminuted cooked meat sausage products such as Lyoner, Frankfurter, Wiener, Bologna and Meat loaf, for example.

Throughout the present specification, the expression low fat sausage products means sausage products having a fat content between 1 and 20%.

For carrying out the process of the present invention, one can use lean meat of pork, beef, mutton or chicken, for example, namely a meat having a fat content between 1 and 20%, two days after slaughtering. One also can use meat of high pH value, namely having a pH>6.0, or so-called dark, firm and dry meat (DFD meat), or even slaughter warm meat (SW meat).

The added fat is preferably an animal fat, such as backfat which has a fat content of about 90%, for example. This added fat may be ground before being added to the batter. However, surprisingly good results may also be obtained with a vegetable oil such as soya oil, sun flower oil or corn oil, for example.

Preferably, a batter is prepared which comprises from 40 to 70% meat, up to 20% added fat and from 20 to 50% ice. Especially good results may be achieved with from 50 to 60% lean meat, up to 15% added backfat, and from 30 to 40% ice.

Preferably, nitrite curing salt and phosphate are added in respective amounts of from 1.2 to 2% and up to 0.3%.

Preferably, 2 to 8 g mixed spices, up to 1 g sodium ascorbate and up to 2 g dextrose may be added per kg of meat batter at the time the fat is added.

Preferably, the pH of the batter should be in the range of 5.8 to 6.5. If the pH of the batter is below this range, there is a risk of important deterioration of the water binding in the sausage product. The myofibrillar proteins may namely begin to increasingly repell water as the pH further drops. An adequate adjustment of pH may even surprisingly permit one not to add any phosphate to the batter while still having a good water binding in the sausage product.

Possible pH adjustments are preferably made by adding sodium carbonate or sodium bicarbonate. Especially good results with respect to the water binding properties of proteins are obtained by adding up to 3 g of sodium bicarbonate per kg of meat batter.

With respect to adequate pH, DFD meat is especially suitable because it has a pH>6.2.

SW meat is also especially suitable because it permits to have good water binding properties in the sausage product. However, this is not only due to the high pH of SW meat but also to the fact that if SW meat is used for carrying out the present process within a period of about 4 h after slaughtering for beef or about 1 h after slaughtering for pork, its excellent water binding properties will be maintained in spite of ATP breakdown.

Grinding the meat and/or the added fat may be carried out in a traditional meat grinder, for example. Chopping the ground meat and/or fat and further chopping the batter may be carried out in a bowl chopper, of which the cutters may rotate at a speed of 2000 to 6000 rpm while the bowl may rotate at a speed of about 10 to 30 rpm, for example.

Stuffing the meat batter may be carried out into natural or synthetic casings or into cans, for example.

Reddening may be carried out by holding for 15 to 45 min at room temperature, for example.

Heating or cooking may be carried out for 15 min to 3 h at 70° to 125° C., either in a cooking chamber, for sausages stuffed in casings, or in a hot water bath or an autoclave for sausages stuffed in cans, for example.

The sausages may then be cooled under cold water and kept in a refrigerated chamber at about 4° to 5° C., for example.

EXAMPLES

The examples hereafter illustrate different embodiments of the process and the product according to the present invention. The percentages are by weight unless otherwise stated.

In these examples, after the step of chopping to a temperature between 12° C and 15° C., a part of the meat batter was stuffed into cans (about 250 g, 99/40 mm) as well as either into internally coated moisture proof fibrous casings of Lyoner type (about 250 g, 50 mm diameter, 250 mm length) or into cellulose casings of Wiener type (about 40 g, 18 mm diameter, 200 mm length).

The sausage products stuffed in cans (canned sausages) and the sausage products stuffed in casings of Lyoner type (Lyoner) were held 30 min at room temperature for reddening. The Lyoner were then heated for 1 h in steam at 75° C. to a temperature of 70° C. in the middle of the sausages. The canned sausages were heated for 2 h at 100° C. in a cauldron. These two products were then cooled in a cold water bath and stored in a refrigerator at 4° C. until they were submitted to different tests.

The sausage products stuffed in casings of Wiener type (Wiener) were held in a smoking chamber for 17 min at 50° C. in air having 60% relative humidity for reddening. They were dried for 7 min at 55° C. in air having 37% relative humidity and they were smoked for 10 min at 68° C. They were then heated or cooked for 12 min at 72° C. in steam having a relative humidity of 99%. They were finally washed and cooled by showering and stored in a refrigerator at 4° C. until they were submitted to different tests.

For testing the jelly separation, the canned sausages were heated to 90° C. and opened. The jelly flowing out from the opened sausages was weighed. The jelly separation is defined as the weight of jelly thus obtained divided by the total weight of the canned sausage multiplied by 100.

The hardness was tested, with an Instron Universal Testing machine, either by shearing 1 cm thick slices of Lyoner with a Kramer multiblade shear press cell (hardness expressed in N/100 g) or by compressing a piece of Wiener 18 mm in diameter and 15 mm in length with a plunger (hardness expressed in N/3.5 g).

The colour, especially the L*-value in the L*, a*, b* system was measured with a Minolta chromameter.

In all the indicated recipes, the sum of the percentages of meat, added fat and ice was 100%. The respective amounts of the other ingredients, namely nitrite curing salt, phosphate and other additives are also indicated in % which are to be understood as by weight of the whole recipe, namely by total weight of the batter.

Example 1

Pork shoulder lean meat and pork backfat were used two days after slaughtering. The lean meat which had a fat content of about 5% was cut into pieces of fist size and the backfat which had a fat content of about 90% was cut into pieces of about 5×10 cm. Both the lean meat pieces and the backfat pieces were separately ground in a meat grinder having a grid with 3 mm openings. The ground meat and fat were stored in a refrigerator at 2° C.

6 kg of low fat sausages were manufactured according to the following recipe:

| | |
|---|---|
| Lean meat | 60% |
| Backfat | 5% |
| Ice | 35% |
| Nitrite curing salt | 15 g/kg meat batter |
| Sodium diphosphate | 2 g/kg meat batter |
| Mixed spices | 3.0 g/kg meat batter |
| Sodium ascorbate | 0.5 g/kg meat batter |
| Dextrose | 1 g/kg meat batter |

The process for manufacturing the low fat sausages was carried out by:

chopping the ground meat, while adding the ice, nitrite curing salt and sodium diphosphate, to a temperature of 2° C., chopping at a temperature maintained at −1° C. by the addition of liquid nitrogen for 7.5 min, chopping, while adding the backfat, mixed spices, sodium ascorbate and dextrose to a temperature of 7° C., chopping at a temperature maintained at 3° C. by the addition of liquid nitrogen for 2.5 min, chopping to a temperature of 13° C., and stuffing, reddening and heating.

The sausages thus obtained had a pH of 5.83, a jelly separation of 4.4%, a hardness of 912 N/100 g and an L*-value of 65.4.

For comparison, a control sausage product was manufactured in the same way except that the steps of chopping for 7.5 min at −1° C. and for 2.5 min at 3° C. under addition of liquid nitrogen were suppressed, this control had a pH of 5.83, a jelly separation of 11.7%, a hardness of 939 N/100 g and an L*-value of 64.5.

Thus, the low fat sausages manufactured by the process illustrated in this Example have much less jelly separation, are more tender and have about the same colour as the control sausage.

Examples 2 to 8

Seven different 6 kg batches of low fat sausages were manufactured according to the same recipe as in Example 1, except that the ratio of lean meat, added fat and ice was varied, and by the same process as in Example 1, except that the chopping times at −1° C. and at 3° C. under addition of liquid nitrogen were varied.

In addition, in Example 8 no phosphate was added.

Tables I and II hereafter indicate the varied parameters, the properties of the sausages thus obtained and the properties of control sausages prepared in the same respective ways but without the chopping steps under addition of liquid nitrogen.

TABLE I

| Ex. No | Ratio Meat:Fat:Ice (%) | pH of meat | Jelly. sep. control (%) | Jelly sep. invention (%) | Chopping time −1° C. (min) | Chopping time 3° C. (min) |
|---|---|---|---|---|---|---|
| 1 | 60:5:35 | 5.83 | 11.7 | 4.4 | 7.5 | 2.5 |
| 2 | 50:10:40 | 5.85 | 13.8 | 6.4 | 10 | 5 |
| 3 | 55:5:40 | 5.81 | 16.2 | 7.5 | 10 | 2.5 |
| 4 | 60:0:40 | 5.83 | 17.4 | 10.9 | 10 | 0 |
| 5 | 50:15:35 | 5.85 | 8.6 | 2.5 | 5 | 5 |
| 6 | 55:10:35 | 5.81 | 10.2 | 3.5 | 5 | 5 |
| 7 | 65:0:35 | 5.83 | 10.6 | 6.2 | 10 | 0 |
| 8 | 60:5:35 | 6.15 | 7.4 | 1.6 | 5 | 2.5 |

TABLE II

| Ex. No | Ratio Meat:Fat:Ice | L*-value Control | L*-value Invention | Hardness Control (N/100 g) | Hardness Invention (N/100 g) |
|---|---|---|---|---|---|
| 1 | 60:5:35 | 64.5 | 65.4 | 939 | 912 |
| 2 | 50:10:40 | 67.5 | 68.3 | 664 | 673 |
| 3 | 55:5:40 | 66.9 | 67.5 | 752 | 649 |
| 4 | 60:0:40 | 64.2 | 64.9 | 811 | 786 |
| 5 | 50:15:35 | 68.8 | 69.8 | 877 | 824 |
| 6 | 55:10:35 | 66.4 | 68.1 | 936 | 834 |
| 7 | 65:0:35 | 64.2 | 64.8 | 1054 | 940 |
| 8 | 60:5:35 | 67.4 | 67.7 | 661 | 648 |

The superiority of the sausages manufactured by the process illustrated in these examples over the respective sausage controls is manifest as to all the tested properties, namely jelly separation (generally less than the half), L*-value (slightly but generally distinctly lighter), and hardness (definitely more tender). Example 8 illustrates the fact that a higher pH permits one not to add any phosphate without losing the other advantages conferred by the present process.

Example 9

6 kg of low fat sausages were manufactured according to the recipe of Example 1, except the fact that slaughter warm meat was used instead of lean meat of pork, and by the same process as in Example 1. The SW meat had a fat content of 14.8% and a pH of 6.22. The pH of the meat batter was 6.03. The sausages thus obtained had a jelly separation of 6.9%, a hardness of 591 N/100g, and an L*-value of 69.6.

A control sausage made by also using SW meat instead of lean meat and without the chopping steps under addition of liquid nitrogen had a distinctly higher jelly separation of 8.1% while the other properties were similar.

Examples 10 and 11

Two 6 kg batches of low fat sausages were manufactured according to the same recipe as in Example 1, except that in Example 10, 1% collagen and in Example 11, 2% sodium caseinate were added to the batter at the time the backfat was added.

For comparison, control sausage products were manufactured in the same way except that the steps of chopping for 7.5 min at −1° C. and for 2.5 min at 3° C. under addition of liquid nitrogen were suppressed. Table III hereafter indicates the properties of the sausages thus obtained.

TABLE III

| Ex. No | Particulars | pH of meat | Jell. sep. (%) | Hardness (N/3.5 g) | L*-value |
|---|---|---|---|---|---|
|  | control (to Ex. 10) 1% collagen | 5.82 | 12.3 | 122 | 64.2 |
| 10 | invention 1% collagen | 5.78 | 4.4 | 109 | 65.6 |
|  | control (to Ex. 11) 2% sodium caseinate | 5.76 | 7.0 | 108 | 64.3 |
| 11 | invention 2% sodium caseinate | 5.77 | 0.8 | 104 | 66.6 |

These examples illustrate the fact that even when also using binders the present process permits to obtain sausage products having clearly improved properties, namely less jelly separation, more tenderness and lighter colour.

Examples 12 and 13

Two 6 kg batches of low fat sausages were manufactured according to the following recipes:

|  | Ex. 12 | Ex. 13 |
|---|---|---|
| Lean meat | 60% | 55% |
| Backfat | 5% | 5% |

-continued

| Ice | 35% | 40% |
| --- | --- | --- |

Ex. 12 and Ex. 13

| | |
| --- | --- |
| Nitrite curing salt | 15 g/kg meat batter |
| Sodium diphosphate | 2 g/kg meat batter |
| Sodium bicarbonate | 1 g/kg meat batter (0.5 to 3 g/kg, e.g. 1 g/kg) |
| Mixed spices | 3.0 g/kg meat batter |
| Sodium ascorbate | 0.5 g/kg meat batter |
| Dextrose | 1 g/kg meat batter |

The process for manufacturing the low fat sausages was carried out by the same process as disclosed in Example 1.

For comparison, two control sausage products were manufactured in the same way, except that the steps of chopping for 7.5 min at −1° C. and for 2.5 min at 3° C. under addition of liquid nitrogen were suppressed.

Table IV hereafter illustrates the properties of the sausages thus obtained:

TABLE IV

| Ex. No | Particulars | pH of meat batter | Jell. sep. (%) | Hardness (N/3.5 g) | L*-value |
| --- | --- | --- | --- | --- | --- |
| | control (to Ex. 12), 0.1% sodium bicarbonate | 6.09 | 0.5 | 120 | 64.2 |
| 12 | invention, 0.1% sodium bicarbonate | 6.04 | 0.1 | 89 | 65.7 |
| | control to Ex. 13), 0.1% sodium bicarbonate | 6.11 | 2.6 | 67.1 | 64.2 |
| 13 | invention, 0.1% sodium bicarbonate | 6.11 | 0.5 | 63.2 | 64.8 |

The results illustrated in Table IV clearly illustrate the fact that even sausages as good as those obtained with the sole addition of sodium bicarbonate can be improved as to all the tested properties by providing for additional chopping steps at low temperatures under the addition of liquid nitrogen.

I claim:

1. A process for preparing a low fat sausage product comprising:
   grinding a lean meat to obtain a ground meat;
   firstly, chopping the ground meat for from 2 mins to 10 mins to obtain a chopped meat, and during chopping, adding a nitrite curing salt and ice to the ground meat being chopped and adding liquid nitrogen to maintain the temperature of the meat being chopped between −2° C. and 3° C. to obtain a chopped meat product,
   secondly, further chopping the chopped meat product for up to 10 mins and during the further chopping, adding fat to the chopped meat product and then chopping the fat and adding liquid nitrogen to maintain the temperature of the chopped meat product and fat being chopped between 1° C. and 10° C. to obtain a chopped meat and fat product,
   wherein the ground meat, added fat, ice and nitrite salt are present in amounts so that the chopped meat and fat product has a fat content of from 1% to 20% by weight based upon the weight of the chopped meat and fat product; and
   thirdly, further chopping the chopped meat and fat product until the chopped meat and fat product has a temperature between 12° C. and 15° C. to obtain a batter product;
   stuffing the batter product in a container selected from the group consisting of casings and cans for containing the batter product;
   reddening the stuffed batter product to obtain a reddened product; and
   heating the reddened product at a temperature of from 70° C. to 125° C. to obtain a sausage product.

2. A process according to claim 1 wherein the lean meat has a fat content of between 1% and 20%.

3. A process according to claim 1 wherein the process is carried out without addition of a substance for binding water in the sausage product.

4. A process according to claim 1 wherein during the further chopping of the chopped meat product, the temperature is maintained between 1° C. and 7° C.

5. A process according to claim 1 wherein the meat has a pH≧6.0.

6. A process according to claim 1 wherein the meat is DFD meat.

7. A process according to claim 1 wherein the meat is slaughter-warm meat.

8. A process according to claim 1 further comprising adjusting the pH of the batter product to a pH of from 5.8 to 6.5.

9. A process according to claim 8 wherein the pH is adjusted with sodium bicarbonate.

10. A process according to claim 1 further comprising adding phosphate during chopping of the ground meat.

11. A process according to claim 10 wherein the phosphate is sodium diphosphate.

12. A process according to claim 1 wherein, by weight based upon a weight of the batter product, the ground meat which is chopped is in an amount of from 40% to 70% and the ice is added in an amount of from 20% to 50%.

13. A process according to claim 1 wherein, by weight based upon the weight of the batter product, the ground meat which is chopped is in an amount of from 50% to 60% and the ice is added in an amount of from 30% to 40% and wherein the fat comprises backfat.

14. A process according to claim 1 further comprising adding up to 2 g dextrose per kg ground meat during further chopping of the chopped meat product.

15. A process according to claim 1 wherein the fat is a ground animal fat.

16. A process according to claim 1 wherein the fat is a vegetable oil.

17. A process according to claim 16 wherein the vegetable oil is selected from the group consisting of soya oil, sunflower oil and corn oil.

18. A process according to claim 1 wherein the stuffed batter product is reddened at room temperature for 15 minutes to 45 minutes and the reddened product is heated for from 15 minutes to 3 hours.

* * * * *